(12) United States Patent
Eng et al.

(10) Patent No.: US 9,055,015 B2
(45) Date of Patent: Jun. 9, 2015

(54) SYSTEM AND METHOD FOR ASSOCIATING MEDIA FILES WITH MESSAGES

(75) Inventors: Kai Y. Eng, Atlantic Highlands, NJ (US); Pramod Pancha, Belle Mead, NJ (US)

(73) Assignee: Private Group Networks, Inc., Atlantic Highlands, NJ (US)

( * ) Notice: Subject to any disclaimer, the term of this patent is extended or adjusted under 35 U.S.C. 154(b) by 601 days.

(21) Appl. No.: 13/417,711

(22) Filed: Mar. 12, 2012

(65) Prior Publication Data

US 2013/0210419 A1   Aug. 15, 2013

Related U.S. Application Data

(60) Provisional application No. 61/597,260, filed on Feb. 10, 2012.

(51) Int. Cl.
*H04M 11/10* (2006.01)
*H04L 12/58* (2006.01)
*H04L 29/08* (2006.01)
*H04W 4/14* (2009.01)

(52) U.S. Cl.
CPC .............. *H04L 51/10* (2013.01); *H04L 67/2823* (2013.01); *H04W 4/14* (2013.01)

(58) Field of Classification Search
CPC ............ H04W 4/12; H04W 4/06; H04W 4/14; H04W 4/008; H04M 2203/4536; H04M 3/533; H04M 1/7255; G06F 17/30017; G06F 17/30041; G06F 17/30746; G06F 17/30755
USPC ................ 455/466, 412.2, 412.1, 414.1, 413, 455/426.1, 433, 445, 425, 458, 414.4; 379/88.11, 88.13, 201.04, 88.18, 379/88.25, 88.26
See application file for complete search history.

(56) References Cited

U.S. PATENT DOCUMENTS

2002/0110224 A1 *   8/2002   Kovales et al. ............... 379/67.1
2006/0128367 A1 *   6/2006   Vanhatalo ..................... 455/418

* cited by examiner

*Primary Examiner* — Fred Casca
(74) *Attorney, Agent, or Firm* — Kaplan Breyer Schwarz & Ottesen, LLP (57) ABSTRACT

A system and method for composing an audio message are disclosed, which may include a memory for storing control parameters identifying respective preconfigured audio segments, the preconfigured audio segments being emotones; a recorder for enabling a user of the recording system to introduce user voice input into an audio message; and a command for enabling the user of the recording system to selectively add user voice input and emotones into the audio message.

16 Claims, 4 Drawing Sheets

SYSTEM AND METHOD FOR ASSOCIATING MEDIA FILES WITH MESSAGES

CROSS-REFERENCE TO RELATED APPLICATIONS

This application claims the benefit of U.S. Provisional Patent Application Ser. No. 61/597,260, filed Feb. 10, 2012, entitled "Mixing Special Sounds as Emotional Gestures in Voice Messages for Mobile Applications", the entire disclosure of which is hereby incorporated herein by reference.

BACKGROUND OF THE INVENTION

In today's email systems which may include SMS (Short Message Service), texting and online posting, it is common to include so-called emoticons or emotional icons as an emotional gesture or expression by the sender. For example, the smiley face is almost universal, and it is often entered (or typed) by users by entering the keystroke sequence: ":-)" on a regular keyboard. Many display systems recognize this keystroke sequence and display the smiley-face graphical symbol in response thereto. In fact, the Apple iPhone® provides a custom keyboard called Emoji to allow users enter varieties of emoticons conveniently. Other smartphones and smart mobile devices have similar capabilities.

A related practice among these messaging services is the use of Internet slang in the message itself. For example, "LOL" means Laughing Out Loud. Various online dictionaries are available that define a extensive list of abbreviations used in this manner. The common thread between emoticons and Internet slang is that they represent a form of emotional gesture expressed by the sender as part of the message. It is also not uncommon to see a message including a single emoticon or a single Internet slang expression with no other written text. This practice so far is limited to text-based messaging or posting. It is also important to note that these emoticons and Internet slang expressions are embedded into messages and are thus not attachments that are separately opened and then read.

However, evolving technologies including those employed with increasingly popular Smartphones enable the use of ever more diverse types of communication formats. And the forms of emotional gesturing used in messaging of the longer established technologies don't fit well with various emerging technologies. Accordingly, there is a need in the art for a system and method for enabling emotional gesturing that is compatible with new forms of data communication between users of various modern devices.

SUMMARY OF THE INVENTION

According to one aspect, the present invention is directed to a system for composing an audio message, which may include a memory for storing control parameters identifying respective preconfigured audio segments, the preconfigured audio segments being emotones; a recorder for enabling a user of the recording system to introduce user voice input into an audio message; and command input means for enabling the user of the recording system to selectively add user voice input and emotones into the audio message. Other aspects, features, advantages, etc. will become apparent to one skilled in the art when the description of the preferred embodiments of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

DETAILED DESCRIPTION OF THE PREFERRED EMBODIMENTS

In the following description, for purposes of explanation, specific numbers, materials and configurations are set forth in order to provide a thorough understanding of the invention. It will be apparent, however, to one having ordinary skill in the art that the invention may be practiced without these specific details. In some instances, well-known features may be omitted or simplified so as not to obscure the present invention. Furthermore, reference in the specification to phrases such as "one embodiment" or "an embodiment" means that a particular feature, structure or characteristic described in connection with the embodiment is included in at least one embodiment of the invention. The appearances of phrases such as "in one embodiment" or "in an embodiment" in various places in the specification do not necessarily all refer to the same embodiment.

Our interest here is to apply the concept of emotional gestures to multimedia messaging including voice messaging and/or video messaging by mobile users. Specifically, this disclosure enables define, configure files for, and use special sounds, still images, and/or video segments, to designate audio segment, or multimedia segment, analogous to an emoticon or Internet slang expression. Such media segments are referred to herein as Emotones.

Emotones may include human voice-like sounds, but are not limited to human voice sounds. Emotones may include the sounds of machine voice, musical instruments, sounds mimicking machinery or other sounds that users are familiar with, special sound effects such as the type used in movies and video animation, among other types of sounds in addition to, or in place of, human voice sounds.

Moreover, in an alternative embodiment, emotones could include preconfigured image data (either still image or continuous-action video) in addition to, or in place of, audio data. For example, the user-uttered expression "I just had an idea!" could be accompanied by a combination of audio and image or video imagery commonly used in animation in this context. For example, the "idea" text, quoted above, could be accompanied by the image of a light bulb turning on (using either a still image or a brief video sequence) and a sound including a brief high-pitched sound. Thus, in this alternative embodiment, either or both of (a) the user-generated media data and (b) the preconfigured emotone media data could include any one of, or any combination of: voice, other sounds, still images, and video segments. Moreover, user-generated media need not be limited to voice data. Instead, users could generate video segments for incorporation into a message either in place of, or in addition to, voice segments. Moreover, still images could be added to the user message.

For example, the expression "LOL" is commonly presented as a snippet of human laughing in text messages. Specific Emotones may be preconfigured in a system and may be made available for use by users of mobile communication devices with smartphones, as needed, for inclusion in voice messages to be sent to other users of mobile devices. In other words, we have devised a practical way to enable mobile device users to compose and send voice messages with Emotones embedded in the voice messages. Existing systems do not provide this capability.

In an embodiment, users may use mobile phones to exchange voice messages with one another. The users' mobile phones may be modern smartphones that are capable of connecting to the cellular network with data and Internet services. These smartphones also support the use of mobile software applications (commonly referred to as "apps") that may be downloaded to the phones to provide specific services. Mobile applications have become popular in recent years and enjoy widespread use in all types and makes of smartphones.

One example is a messaging application that allows users to send text messages to one another using the data channel instead of the SMS (Short Message Service) in the phone. Among voice messaging apps, the typical approach is to use the data or Internet channel to support the voice message delivery.

We note that devices other than mobile communication devices may combine the various types of media files needed to form a complete audio message, or complete multimedia message that includes image data. For instance, a desktop personal computer could be used in this manner, among other types of generally fixed types of computing equipment. Moreover, computer equipment need not necessarily communicate over wireless communication links to practice the concepts disclosed herein. A desktop computer coupled to a local area network, and/or the Internet, over a wired connection may be used to record voice data and to incorporate either control parameters that identify additional media files, or to incorporate the additional media files (either audio, video, still-image etc.) themselves into a complete multimedia message.

Figure 1:
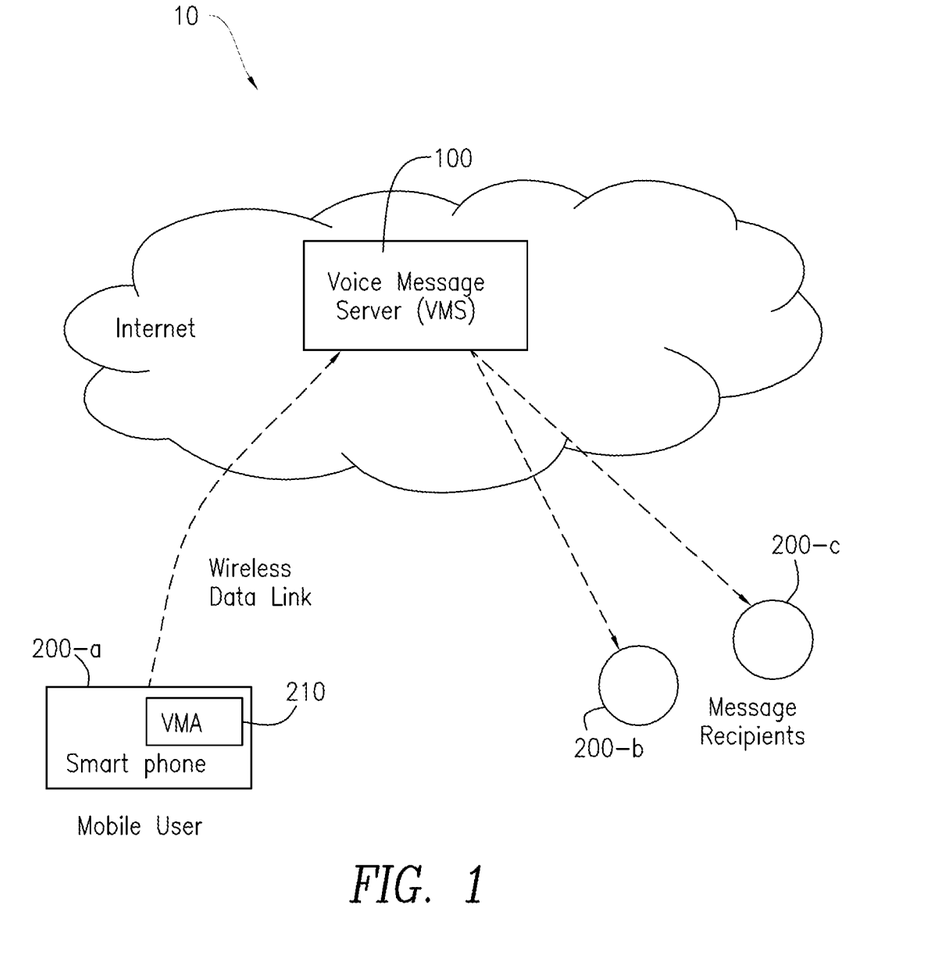
FIG. 1 is a block diagram showing a communication network enabling communication among mobile devices in accordance with an embodiment of the present invention.

FIG. 1 is a block diagram showing a communication network 10 enabling communication among mobile devices 200 in accordance with an embodiment of the present invention. Communication network 10 may include Voice Message Server (VMS) 100, mobile devices 200-a, 200-b, 200-c etc (collectively mobile devices 200), which mobile devices may in turn include respective instances of voice message application (VMA) 210.

FIG. 1 depicts a system 10 in which a user with a mobile phone 200-a (also referred to herein as M1) uses a voice messaging application 210 to generate a voice message for a selected recipient. The VMA 210 preferably provides a convenient interface to enable a user to record and send a voice message to other users, and also to retrieve voice messages received from other users. The VMA 210 preferably communicates with a voice messaging server (VMS) 100 in network 10 to support the messaging service by storing and delivering the voice messages to recipients.

In an embodiment, VMA 210 of mobile device 200-a provides a graphical user interface for a user to designate a recipient and to record a voice message for delivery to that designated recipient. The recorded message may first be sent to the VMS 100 so that the VMS 100 can deliver the message to the intended recipient. For various reasons, the VMS 100 may first store the message from mobile device 200-a before delivering it to the recipient device. For example, the recipient device 200-x may be unavailable (that is, the recipient's phone or VMA 210 may be turned off). After delivering the message to the recipient, the VMS 100 may delete the message or keep a copy thereof. In the following, we describe the contents and generation of the voice message.

Figure 2:
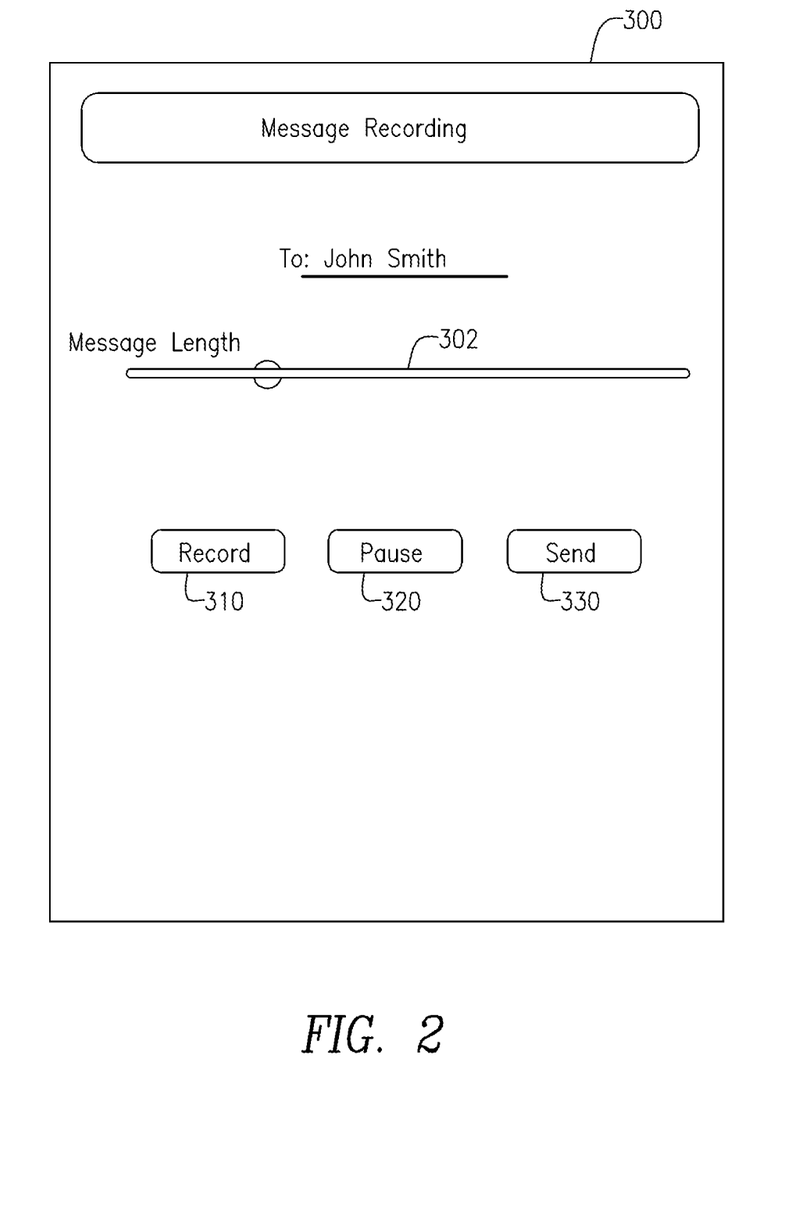
FIG. 2 is an illustration of a user interface screen useable to prompt a user of a mobile device to record a voice message in accordance with an embodiment of the present invention.

In an embodiment, to enable a user to create a voice message using mobile device 200-a for delivery to a recipient, VMA 210 may present a screen 300 to the user on device 200-l that includes the recipient name and control inputs 310, 320, and 330 to compose the recording (see FIG. 2). A message length indicator 302 may also be provided.

A user interface for enabling such inputs may take many forms. For example, the recording might be done with traditional names for the respective controls such as "Record, Pause/Resume," "Review," and "Send" etc. Alternatively, the interface could include a soft or hard button that a user contacts, wherein the user then speaks while the button is depressed. In addition, the VMA 210 may enable the user of device 200-a to add an attachment to the message such as a video segment, a document, a text file, a sound file, among other types of attachments.

In an embodiment, attachments, as described above, may be data entities that are distinct and separate from the voice message itself, even though the attachments may be linked to the voice message to enable a recipient of the voice message to readily access and view (or hear) the attachments. Thus, when using the message-and-attachment format of data communications, the voice message and any files attached to, or linked to, the voice message, are preferably separate (i.e. non-integrated) files and are preferably delivered to the recipient in that manner. Thus, in this embodiment, the user of device 200-a preferably records only the voice message itself using the VMA controls.

Emotones

In an embodiment, the role of emotones in voice messages may be considered analogous to the role of emoticons in text and email messages. There are numerous Internet or text slang expressions that may be represented using emoticons. For example, "LOL" stands for "Laughing Out Loud," and "TTYL" means "Talk to You Later." Turning to emoticons, one commonly used emoticon is the "smiley face" symbol which may generally be entered into a text message using the text string ":)". A graphical image is commonly generated from the above-quoted text by various text editing programs.

The text expressions and graphical image discussed above may all be referred to as expressive gestures. In an embodiment herein, a specified sound may be generated for each gesture, and may be created and then stored in a sound file (also referred to herein as an audio file) that is stored so as to be associated with a corresponding gesture. The "specified sounds" may include any sound a user may wish to include in a voice message (or in a multimedia message that includes audio data among other types of data) that aids in conveying in idea, emotion, or other aspect of the message. For instance, a specified sound for an emotone may include human voice, machine voice, musical notes, or any sound that can be used to represent a gesture.

In one embodiment, emotone files may be defined, created, catalogued and/or stored in the VMS 100 for later use by users sending messages to one another using mobile devices 200, or other computing devices, and VMS 100. Each Emotone may be referenced by a specific pointer to the file location thereof in the VMS 100. In alternative embodiments, emotones may be defined, created, and stored in locations other than VMS 100. In one embodiment, an individual mobile device 200-a may be used to create and store an emotone and store the emotone in mobile device 200-a, or any other device that is in communication with mobile device 200-*a*. In some embodiments, mobile device 200-*a* may send a message that includes a voice segment and a link or pointer to an emotone that is stored within VMS 100. In other embodiments, mobile device 200-*a* may instead access any needed emotones within its own data storage and transmit a message to VMS 100 that already includes all of the emotones associated with the transmitted voice message. In yet other embodiments, the emotones could be added by the recipient device (such as, for instance, device 200-*c* in FIG. 1).

Figure 3:
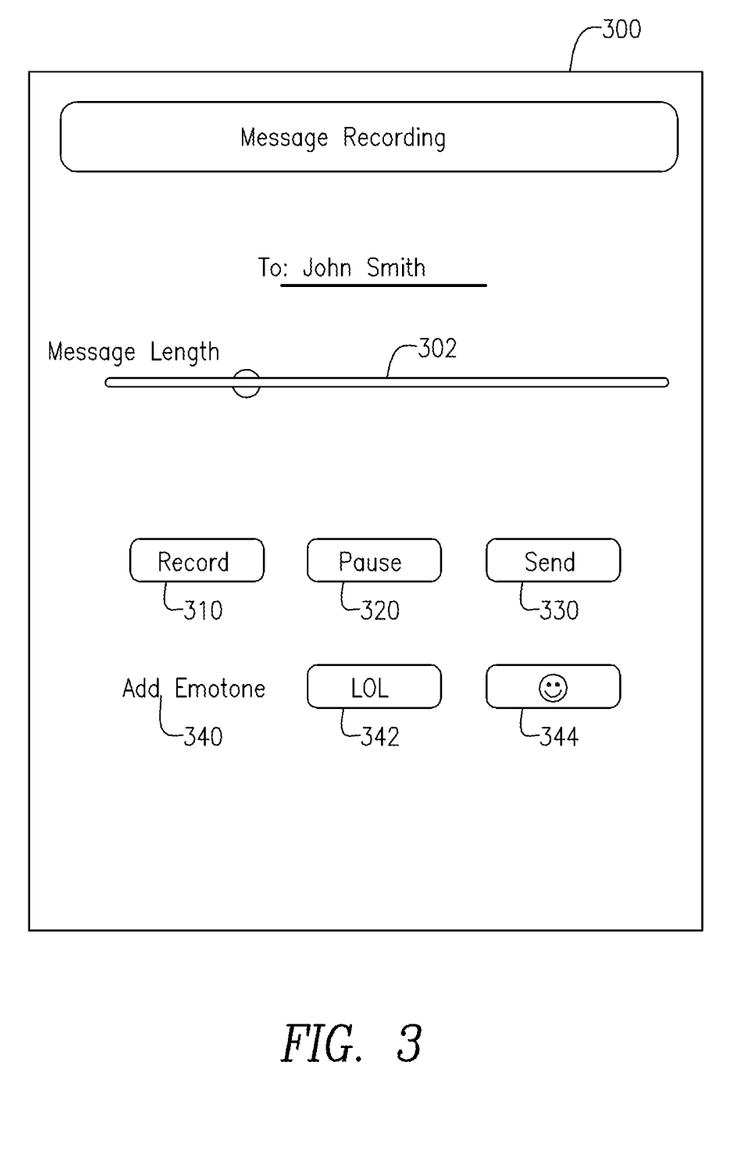
FIG. 3 is an illustration of a user interface screen useable to prompt a user of a mobile device to record a voice message that includes emotones, in accordance with an embodiment of the present invention.

FIGS. 2 and 3 show user interfaces that may be generated by VMA 210 for presentation on a display screen of mobile device 200-*a*. FIG. 2 shows a user interface menu without the Emotone button. FIG. 2 shows various labeled recording functions 310-330. FIG. 2 also shows a message-length bar 302 to indicate the length of the recorded message, to provide for convenient reviewing of the message prior to a transmission of the message to VMS 100.

FIG. 3 shows a graphical user interface similar to that of FIG. 2, but with the ability to add emotones 340 included. For the sake of simplicity and compactness, FIG. 3 only displays two buttons associated with two respective emotones. However, the present invention is not limited to using the two emotones displayed in FIG. 3. An Emotone button may be tapped before Record, after Stop or Pause to insert the selected emotone into the voice message. An example of a voice message having emotones incorporated therein is provided below.

Generation of Exemplary Voice Message with Emotones Included

One possible sequence of steps is as follows: 1) Tap the "Record" key; 2) Utter the text sequence: "Hi, Bob, thanks for the birthday card"; 3) Tap the Pause key; 4) Tap LOL; 5) Tap the "Resume" key; 6) Utter the text sequence: "What a funny card"; 7) Tap the Pause key or Stop; 8) Tap Smiling; 9 Tap Send. The voice message created using steps (1) through (9) above may be played as follows:

INTEGRATED VOICE MESSAGE RESULT: "Hi, Bob, thanks for the birthday card. (Laughing sound) What a funny card. ("Smiling" sound)".

A preferred embodiment may include the following two features. First, a user of mobile device 200-*a* is preferably able to compose and generate an audio message that includes human voice and/or Emotones by simply tapping on soft or hard buttons on a display screen of mobile device 200-*a*. Second, the final audio message ultimately transmitted from mobile device 200-*a* to VMS 100, and thereafter to the recipient, may be played as a single integrated message with Emotones embedded into the message itself. Moreover, some emotones may be set up to be background sound, and the message data may be configured to play the background-sound emotone simultaneously with other audio data in the same audio message. The user interface may be set up to enable a user to implement simultaneous sounds using the interface shown in FIGS. 2 and 3. Below, we discuss how to implement the aforementioned Emotone recording in the VMA software.

In many modern smartphones, voice codecs are available for recording audio data. The VMA 210 may use such codecs to generate digital voice streams or packets, and then send the digital voice streams to the VMS 100. The VMA 210 may also be used to stream the voice packets to the VMS 100 as the user speaks into the smartphone's built-in microphone. Alternatively, the smartphone 200-*a* may queue up the entire voice segment in a local memory storage device (not shown) and then send the file to the VMS 100 in response to the user pressing the "Send" button. Either way, the VMS 100 preferably receives a voice file corresponding to the media part of the voice message itself.

The treatment of image data may proceed in an manner analogous to the above discussion of the generation and transmission of voice data, and other types of audio data. Specifically, many modern smartphones include still cameras and video cameras. Thus, the smartphone may be used obtain and store one or more still images and/or one or more video segments. Thereafter, the smartphone 200-*a* may transmit a multimedia message, that may include recorded voice segments, control parameters that identify emotone audio segments, or actual emotone audio segments. However, in this embodiment, the multimedia message may further include user-generated still image data, user-generated video segments; control parameters that identify preconfigured still images, or preconfigured still images themselves; control parameters that identify preconfigured video segments, and/or preconfigured video segments themselves. Thus, multimedia messages may be created that include any combination of user-generated material in audio, still-image, and/or continuous-video form; as well as preconfigured material (that is, emotone-like material that is accessed by, but usually not generated by, the user) in audio form, still-image form, and/or continuous-video form.

A protocol may be provided to enable communication between VMA 210 and VMS 100 for the transfer of audio files, or multimedia files, generated as described herein. For example, a standard protocol such as HTTP (Hypertext Transfer Protocol) may be used to support the voice file transfer from mobile device 200-*a* to VMS 100, as well as the transfer of control parameter information from VMA 210 to VMS 100 associated with the preconfigured audio segments of the audio message. Using the aforementioned example, the message may include two voice segments (steps #2 and #6), and two Emotone audio segments (steps #4 and #8). The two voice segments could be stored by the VMA 210 in two respective voice files, and the entire message to be transmitted may consist of the first voice file followed by the "LOL" Emotone (or a control parameter that identifies the "LOL" emotone, and then the second voice file followed by the Smiling Emotone (or a control parameter identifying the smiling emotone).

If the Emotones audio files are stored in VMA 210 memory, then the VMA 210 could assemble an entire message file as a single audio file by inserting the Emotones into the two audio files before transmitting the entire message to the VMS 100. Alternatively, control parameters (which may be referred to as control data) could be designated for each Emotone, and the resulting message structure, which would include a combination of spoken voice segments and sets of control parameters for respective emotones, could be transmitted to the VMS 100. Thereafter, the VMS 100 may assemble a final audio message using the transmitted voice segments and inserting audio files specified by the respective sets of control parameters. The latter approach (i.e. of assembling the message the VMS 100) provides the advantage of minimizing the data transmission bandwidth between the mobile device 200-*a* and the VMS 100, and avoiding the need for storing Emotone sound files in the local memory of the mobile device 200-*a*.

Additionally, as plural users in a population accumulate Emotones, the entire library could be made available to other users of VMS 100. Such availability may be accomplished by permitting access to the library by the users, or by downloading, from time to time, the updated library from VMS 100 to individual mobile devices.

The message transmitted from the VMA 210 to the VMS 100, consistent with the emotone example discussed above, could include the following coding specifications:

a) Message=4 segments
b) Segment #1=Voice File #1
c) Segment #2=Emotone LOL
d) Segment #3=Voice File #2
e) Segment #4=Emotone Smiling
f) Voice File #1="Hi, Bob, thanks for the birthday card."
g) Voice File #2="What a funny card."

The information between (a) and (e) includes control parameters while the voice files in coding specifications (f) and (g) are voice media files. Specifically, part (a) states that the message should have 4 voice segments. Part (b) states that the first segment should be the voice media contained in Voice File #1. Part (c) states that the second segment is the Emotone called "LOL." Part (d) states that the third segment is the voice media contained in Voice File #2. Part (e) states that the last segment is the Emotone called "Smiling." Part (f) is the recorded media file called Voice File #1, and part (g) is the other recorded media file called Voice File #2. With all of the above specifications, the VMS 100 can assemble the various components into a single voice file and transmit the assembled single voice file to the recipient. In this embodiment, the recipient device need not have any special data processing capabilities other than the ability to play the voice file transmitted from the VMS 100.

However, in an alternative embodiment, the VMS 100 could retransmit the above-described message, with coding specifications (a) through (g) to the recipient mobile device **200-*b* without modification. Thereafter, recipient mobile device 200-*b*** could assemble the final audio file including all of the spoken voice segments and all of the emotones.

Figure 4:
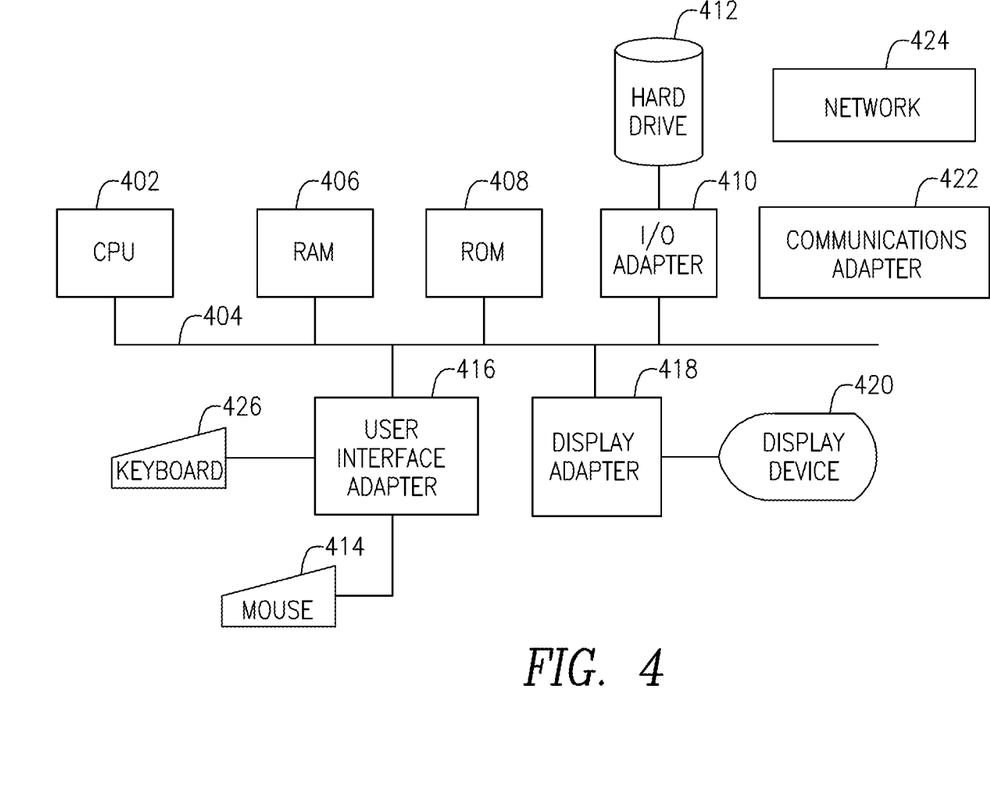
FIG. 4 is a block diagram of a computer system useable in conjunction with an embodiment of the present invention.

FIG. 4 is a block diagram of a computing system 400 adaptable for use with one or more embodiments of the present invention. For instance, one or more of the communication devices 200, of the computers deployed within the voice message server 100, or other computers discussed in this disclosure may incorporate some or all of the features of computing system 400.

Central processing unit (CPU) 402 may be coupled to bus 404. In addition, bus 404 may be coupled to random access memory (RAM) 406, read only memory (ROM) 408, input/output (I/O) adapter 410, communications adapter 422, user interface adapter 406, and display adapter 418.

In an embodiment, RAM 406 and/or ROM 408 may hold user data, system data, and/or programs. I/O adapter 410 may connect storage devices, such as hard drive 412, a CD-ROM (not shown), or other mass storage device to computing system 400. Communications adapter 422 may couple computing system 400 to a local, wide-area, or global network 424. User interface adapter 416 may couple user input devices, such as keyboard 426, scanner 428 and/or pointing device 414, to computing system 400. Moreover, display adapter 418 may be driven by CPU 402 to control the display on display device 420. CPU 402 may be any general purpose CPU.

It is noted that the methods and apparatus described thus far and/or described later in this document may be achieved utilizing any of the known technologies, such as standard digital circuitry, analog circuitry, any of the known processors that are operable to execute software and/or firmware programs, programmable digital devices or systems, programmable array logic devices, or any combination of the above. One or more embodiments of the invention may also be embodied in a software program for storage in a suitable storage medium and execution by a processing unit.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A method comprising:
   displaying, by a first device, an interface, wherein the first device is a mobile device, and wherein the first device displays the interface to a first user in response to executing a voice mail application (VMA) stored in the first device;
   receiving, by the first device, from the first user via the interface:
   (i) a first input, wherein the first input designates a second device associated with a second user for transmitting a message;
   (ii) a second input, wherein the second input is a first voice segment recorded by the first user;
   (iii) a third input, wherein the third input inserts a first control data into the message; and
   (iv) a fourth input, wherein the fourth input inserts a first audio segment into the message, and wherein inputs (i) through (iv) are performed by the first user on the first device prior to establishing a communications channel with a server for transmitting the message;
   composing, by the first device, the message based on inputs (i) through (iv); and
   transmitting, by the first device, the message composed by the first device to the server;
   wherein, upon receiving the message from the first device, the server:
   (v) retrieves a second audio segment in response to detecting the control data in the message composed by the first device;
   (vi) replaces the control data in the message received from the first device with the second audio segment;
   (vii) determines if the second device is available to receive the message, wherein the server stores the message in a memory when the second device is determined to be unavailable to receive the message; and
   (viii) transmits the message to the second device when it is determined that the second device is available to receive the message, wherein the message comprises the first voice segment and the first and second audio segments.

2. The method of claim 1 wherein the second input for recording the voice segment comprises:
   depressing, by the first user, a soft or hard button on the first device; and
   releasing, by the first user, the soft or hard button on the first device to end the recording of the first voice segment.

3. The method of claim 1 wherein the message composed by the server is stored in the memory when it is determined by the server that the second device is turned off; and
   wherein the server deletes the message stored in the memory after transmitting the message to the second device.

4. The method of claim 1 wherein the first and second audio segments are created by the first user;
   wherein the first audio segment is stored in the first device; and wherein the second audio segment is stored in the memory of the server.

5. The method of claim 1 wherein the first audio segment is inserted at a different point in the message than the control data; and wherein the second device conveys the first and second audio segments to the second user based on how the first audio segment and the control data are combined with the first voice segment by the first user.

6. The method of claim 1 wherein the first and second audio segments are at least one of a human voice, a machine-generated voice, a special effects sound, and a musical instrument sound; and wherein the first and second audio segments are different sounds that convey different emotions of the first user.

7. The method of claim 1 wherein the first and second audio segments are independent of any image data associated with the message.

8. The method of claim 1 wherein the third input is a tap of a first soft or hard button on the first device; and wherein the fourth input is another tap of a second soft or hard button on the first device.

9. The method of claim 1 wherein the second input comprises the first user uttering a speech into the first device; and wherein the first device records and stores the user-uttered speech.

10. The method of claim 1 wherein the server stores a catalog that comprises a plurality of audio segments in the memory; and wherein each of the audio segments in the plurality is identifiable by a respective control data that can be entered into one or more mobile devices that are in communication with the server.

11. A communication network comprising:

a plurality of devices, wherein the plurality of devices comprises a first mobile device and a second mobile device, and wherein the first mobile device is configured to:

(i) receive, via an interface, a first input from a first user, wherein the first input designates a second mobile device associated with a second user for transmitting a message, and wherein the first mobile device is configiured to display the interface to the first user in response to executing a voice mail application (VMA) stored in the first device;

(ii) receive, via the interface, a second input from the first user, wherein the second input is a first voice segment recorded by the first user;

(iii) receive, via the interface, a third input from the first user, wherein the third input inserts a first control data into the message;

(iv) receive, via the interface, a fourth input from the first user, wherein the fourth input inserts a first audio segment into the message, and wherein inputs (i) through (iv) are performed by the first user on the first device prior to establishing a communications channel in the communication network for transmitting the message; and (v) compose the message based on inputs (i) through (iv);

a server, wherein the server is configured to:

(vi) receive, via the communication network, the message composed by the first mobile device;

(vii) retrieve a second audio segment in response to detecting the control data in the message composed by the first mobile device;

(viii) replace the control data in the message received from the first mobile device with the second audio segment;

(ix) determine if the second mobile device is available to receive the message, wherein the server stores the message in a memory when the second mobile device is determined to be unavailable to receive the message; and (x) transmit the message to the second mobile device when it is determined that the second mobile device is available to receive the message, wherein the message comprises the first voice segment and the first and second audio segments.

12. The communication network of claim 11 wherein the voice message application (VMAs), executing on digital hardware, installed on the first mobile device, for providing the interface to enable the first user to compose messages including recorded voice segments and control data sequences identifying respective audio segments.

13. The communication network of claim 12 wherein each of the audio segments include audio data of one or more types selected from the group consisting of: (a) human voice; (b) machine-generated voice; (c) special effects sounds; and (d) musical instrument sounds.

14. The communication network of claim 11 wherein each of the first and second mobile devices comprises:

a memory for storing one or more control parameters associated with respective audio segments.

15. The communication network of claim 11 wherein the first mobile device comprises:

a display screen for displaying the interface to enable the first user to enter inputs (i) through (iv).

16. A method comprising:

displaying, by a first device, an interface;

receiving, by the first device, from a first user via the interface:

(i) a first input, wherein the first input designates a second device associated with a second user for transmitting a message;

(ii) a second input, wherein the second input is a first voice segment recorded by the first user, and wherein the second input for recording the first voice segment comprises depressing a soft or hard button on the first device and releasing the soft or hard button to end the recording of the first voice segment;

(iii) a third input, wherein the third input inserts a first control data into the message; and (iv) a fourth input, wherein the fourth input inserts a first audio segment into the message, and wherein inputs (i) through (iv) are performed by the first user on the first device prior to establishing a communications channel with a server for transmitting the message;

composing, by the first device, the message based on inputs (i) through (iv); and transmitting, by the first device, the message composed by the first device to the server;

wherein, upon receiving the message from the first device, the server:

(v) retrieves a second audio segment in response to detecting the control data in the message composed by the first device;

(vi) replaces the control data in the message received from the first device with the second audio segment;

(vii) determines if the second device is available to receive the message, wherein the server stores the message in a memory when the second device is determined to be unavailable to receive the message; and (viii) transmits the message to the second device when it is determined that the second device is available to receive the message, wherein the message comprises the first voice segment and the first and second audio segments.

* * * * *